US010399780B2

United States Patent
DePaso

(10) Patent No.: US 10,399,780 B2
(45) Date of Patent: Sep. 3, 2019

(54) ENERGY-HARVESTING CONVEYOR BELTS AND METHODS

(71) Applicant: Laitram, L.L.C., Harahan, LA (US)

(72) Inventor: Joseph M. DePaso, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 302 days.

(21) Appl. No.: 15/400,384

(22) Filed: Jan. 6, 2017

(65) Prior Publication Data

US 2017/0113875 A1    Apr. 27, 2017

Related U.S. Application Data

(63) Continuation of application No. 13/884,544, filed as application No. PCT/US2011/060521 on Nov. 14, 2011, now Pat. No. 9,571,012.

(Continued)

(51) Int. Cl.
| | |
|---|---|
| *H02N 11/00* | (2006.01) |
| *B65G 15/32* | (2006.01) |
| *B65G 17/08* | (2006.01) |
| *B65G 23/00* | (2006.01) |
| *B29C 45/00* | (2006.01) |
| *B29C 45/16* | (2006.01) |
| *B29C 45/73* | (2006.01) |

(Continued)

(52) U.S. Cl.
CPC .......... *B65G 15/32* (2013.01); *B29C 45/0001* (2013.01); *B29C 45/0005* (2013.01); *B29C 45/1679* (2013.01); *B29C 45/73* (2013.01); *B29D 29/06* (2013.01); *B65G 17/08* (2013.01); *B65G 23/00* (2013.01); *B65G 43/00* (2013.01); *G01D 11/245* (2013.01); *H02N 2/181* (2013.01); *H02N 2/22* (2013.01); *H02N 11/002* (2013.01); *B29K 2105/06* (2013.01); *B29K 2995/0003* (2013.01); *B29K 2995/0005* (2013.01); *B29K 2995/0007* (2013.01); *B29L 2031/7092* (2013.01); *B65G 2203/042* (2013.01); *H02N 2/186* (2013.01); *H02N 2/188* (2013.01)

(58) Field of Classification Search
CPC ...................................................... H02N 11/002
See application file for complete search history.

(56) References Cited

U.S. PATENT DOCUMENTS

| | | |
|---|---|---|
| 5,125,233 A | 6/1992 | Evanger et al. |
| 5,482,661 A | 1/1996 | Vismara |

(Continued)

FOREIGN PATENT DOCUMENTS

EP    0716992 B1    5/2000

OTHER PUBLICATIONS

Paul O'Shea, "Harvesting Plastic Power," Electronic Products, p. 11, Sep. 2012.

(Continued)

*Primary Examiner* — Fritz M Fleming
(74) *Attorney, Agent, or Firm* — James T. Cronvich

(57) ABSTRACT

Energy-harvesting and -storage devices in conveyor belts and methods for molding those devices integrally into modular plastic belt links. Electroactive polymers or piezoelectric fibers co-injected with a base polymer to form belt modules harvest energy from strain or vibrations in the conveyor belt to power belt on-board devices.

6 Claims, 5 Drawing Sheets

Related U.S. Application Data

(60) Provisional application No. 61/415,922, filed on Nov. 22, 2010.

(51) Int. Cl.

| | | |
|---|---|---|
| *B29D 29/06* | (2006.01) | |
| *G01D 11/24* | (2006.01) | |
| *H02N 2/18* | (2006.01) | |
| *H02N 2/00* | (2006.01) | |
| *B65G 43/00* | (2006.01) | |
| *B29K 105/06* | (2006.01) | |
| *B29L 31/00* | (2006.01) | |

(56) References Cited

U.S. PATENT DOCUMENTS

| | | |
|---|---|---|
| 6,597,076 B2 | 7/2003 | Scheible et al. |
| 6,882,128 B1 | 4/2005 | Rahmel et al. |
| 7,049,732 B2 | 5/2006 | Pei et al. |
| 7,089,099 B2 | 8/2006 | Shostak et al. |
| 7,132,757 B2 | 11/2006 | Steigerwald et al. |
| 7,494,004 B2 | 2/2009 | Stolyar et al. |
| 7,581,439 B2 | 9/2009 | Rensel et al. |
| 7,603,894 B2 | 10/2009 | Breed |
| 7,646,135 B1 | 1/2010 | Churchill et al. |
| 7,659,636 B2 | 2/2010 | Donelan et al. |
| 7,687,977 B2 | 3/2010 | Xu |
| 8,939,280 B2 | 1/2015 | Bogle et al. |
| 9,571,012 B2 * | 2/2017 | DePaso ............... H02N 11/002 |
| 2001/0047725 A1 | 12/2001 | Hugosson |
| 2004/0094387 A1 | 5/2004 | Lapeyre |
| 2004/0262132 A1 | 12/2004 | Pauley et al. |
| 2005/0126618 A1 | 6/2005 | Muller-Werth et al. |
| 2006/0176158 A1 | 8/2006 | Fleming |
| 2007/0188053 A1 | 8/2007 | Stark |
| 2007/0200724 A1 | 8/2007 | Lazo et al. |
| 2007/0222612 A1 | 9/2007 | Krisl |
| 2008/0006513 A1 | 1/2008 | Stolyar |
| 2008/0079550 A1 | 4/2008 | Briggs et al. |
| 2009/0014122 A1 | 1/2009 | Ishibuchi et al. |
| 2009/0135019 A1 | 5/2009 | Smith |
| 2009/0194390 A1 | 8/2009 | Freeman |
| 2009/0194391 A1 | 8/2009 | Lagneaux |
| 2009/0212665 A1 | 8/2009 | Koser et al. |
| 2009/0278275 A1 | 11/2009 | Morandi |
| 2010/0141094 A1 | 6/2010 | Lee et al. |
| 2010/0141096 A1 | 6/2010 | Churchill |
| 2013/0206545 A1 | 8/2013 | Bogle et al. |

OTHER PUBLICATIONS

Shashank Priya, "Advances in energy harvesting using low-profile piezoelectric transducers," J Electroceram (2007) vol. 19:165-182.

Extended European Search Report, EP11843360, dated Aug. 4, 2017, European Patent Office, Munich, Germany.

\* cited by examiner

US 10,399,780 B2

ENERGY-HARVESTING CONVEYOR BELTS AND METHODS

CROSS-REFERENCE TO RELATED APPLICATIONS

This application is a continuation of U.S. patent application Ser. No. 13/884,544, filed May 9, 2013, which is the National Stage of International Patent Application No. PCT/US11/60521, filed Nov. 14, 2011, which claims the benefit of U.S. Provisional Patent Application No. 61/415,922, filed Nov. 22, 2010. The disclosures of those prior applications are incorporated into this application by reference.

BACKGROUND

The invention relates generally to power-driven conveyors and more particularly to instrumented conveyor belts having on-board devices powered by energy harvested from ambient sources.

Sensors, indicators, transmitters, receivers, and other electrical and electromechanical devices are being installed more often in conveyor belts. Most of these devices require electric power to operate. Individual cells or batteries also installed in the belts power the devices. But the batteries require periodic monitoring and eventually manual intervention to install fresh replacements.

SUMMARY

One version of a conveyor belt embodying features of the invention comprises a belt body molded of a base polymer, an energy-harvesting device disposed in or on the belt body, an energy-storage device disposed in or on the belt body and coupled to the energy-harvesting device to store energy harvested by the energy-harvesting device, and an electrical device disposed in or on the belt body and powered by energy stored in the energy-storage device. The energy-harvesting device includes piezoelectric fibers co-injected with the base polymer during molding of the belt body.

Another version of a conveyor belt embodying features of the invention comprises a belt body molded of a base electroactive polymer that generates a voltage when mechanically strained, an energy-storage device disposed in or on the belt body and electrically connected to the electroactive polymer to store energy harvested by the electroactive polymer, and an electrical device disposed in or on the belt body and powered by energy stored in the energy-storage device.

In another aspect, a method for making an injection-molded conveyor belt module comprises: (a) co-injecting piezoelectric fibers with a base polymer into a cavity in a mold for a conveyor belt module with the piezoelectric fibers aligned; (b) applying heat and pressure to the mold to form a conveyor belt module embedded with the piezoelectric fibers; and (c) attaching electrodes in electrical connection with the piezoelectric fibers.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
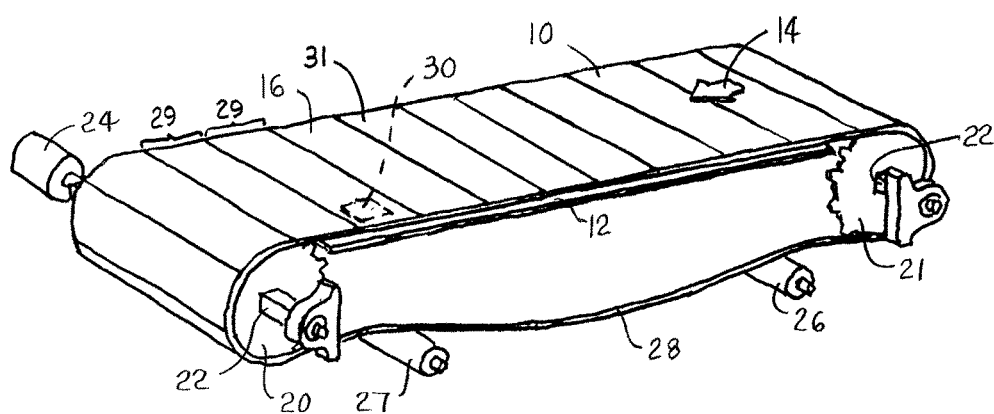
FIG. 1 is an isometric view of a conveyor system having an instrumented conveyor belt embodying features of the invention.
Figure 3:
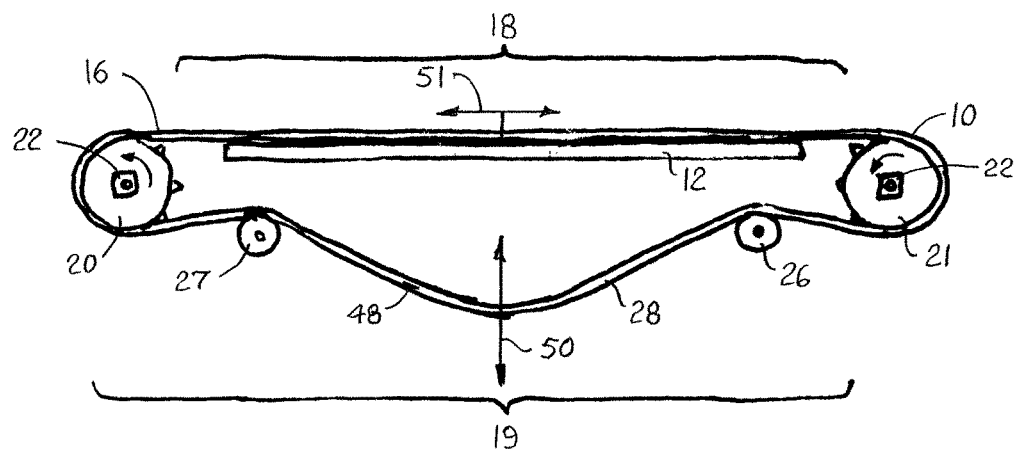
FIG. 3 is a side elevation view of a conveyor belt as in FIG. 1 with a piezoelectric energy-harvesting device sensitive to vibrational energy.

One version of a conveyor system embodying features of the invention is shown in FIGS. 1 and 3. A conveyor, shown in this example as a conveyor belt 10 supported on a carryway 12, transports articles in a conveying direction 14 on an outer conveying surface 16 along a carryway segment 18 of the belt's endless conveyor path. At the end of the carryway, articles are conveyed off the conveyor belt. After rounding drive sprockets 20, the conveyor belt 10 follows a return segment 19 on its way back around idle sprockets 21 to the carryway segment 18. Both the drive and idle sprockets are mounted on rotatable shafts 22. A drive motor 24 is coupled to the drive shaft to drive the belt in the conveying direction 14. In the returnway segment 19, the belt is supported between a pair of spaced apart rollers 26, 27 or shoes to take up sag in the catenary 28 formed between the rollers.

Figure 2:
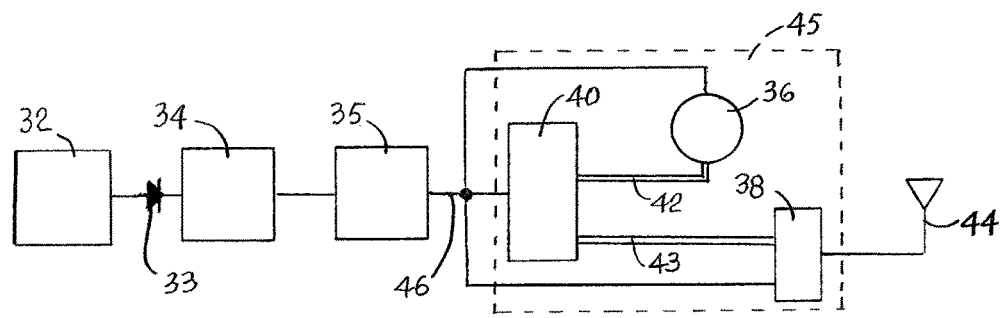
FIG. 2 is a block diagram of an instrumented portion of the conveyor belt of FIG. 1.

As shown in FIG. 1, the conveyor belt 10 is instrumented with an electronic-component package 30 disposed on or in the conveyor belt. Included in the electronic-component package, as shown in FIG. 2, is an energy-harvesting device 32, a rectifier 33, an energy-storage device 34, a voltage regulator 35, a sensor 36, and a transmitter 38. The sensor 36, which may sense temperature, humidity, atmospheric pressure, or some other local condition, makes measurements of the local condition, conditions the measurements, and sends them to a processor 40 over a data line 42. The processor 40 buffers, scales, filters, or formats the sensor measurements before sending them to the transmitter 38 over a data line 43. The transmitter 38 then wirelessly transmits the measurements remotely over an antenna 44. Power to operate the electrical device 45 comprising the sensor, transmitter, processor, and other auxiliary circuitry is provided over power lines 46 by the energy-storage device 34, which may be a capacitor or an electrical cell or battery, through the voltage regulator 35. The energy-harvesting device 32 scavenges energy from external sources coupled to the conveyor belt. The scavenged energy generates a varying voltage that is rectified to charge the energy-storage device, which supplies the energy as needed by the electrical device 45.

Mechanical vibrations are ubiquitous in conveyor systems. In many industrial applications, the environment in which the conveyor operates vibrates. Within the conveyor itself, chordal pulsation of the drive sprocket, vibration of the catenary in the return, and belt-surge pulses are all transmitted through the conveyor belt. These are just a few examples of the kinds of vibrational energy that can be harvested to power electrical or electromechanical devices embedded in a conveyor belt. A piezoelectric device 48 is especially adaptable to serve as an energy-harvesting device to harvest vibrational energy in the conveyor belt as shown in FIG. 3. The piezoelectric device 48 generates an electrical charge when the piezoelectric material is deformed. The cyclic vibrations in the belt cause the piezoelectric device to deform and generate a voltage that can be used to charge the energy-storage device 34. The piezoelectric device 48 may be made of crystals, such as quartz, magnetostrictive materials, or piezoelectric ceramics, for example, and disposed in or on the conveyor belt 10.

One way to enhance the harvesting of vibrational energy is to tune the frequency response of the piezoelectric drive to the frequency spectrum of the belt vibration to maximize the amount of energy harvested. The frequency response of the piezoelectric device has a peak at a center, or resonant, frequency and drops off on either side of the peak to define a bandwidth over a narrow range of frequencies to which the device is especially sensitive. By selecting a piezoelectric device whose bandwidth covers the expected belt-vibration frequencies, energy harvesting is enhanced.

Unlike flat belts, which are frictionally drive by pulleys, modular plastic conveyor belts, which are constructed of a series of rows 29 of fixed-pitch belt modules or links 31, are positively driven by sprockets. Consequently, like power chains, modular plastic conveyor belts are subject to chordal, or polygonal, action as the fixed-pitch belt is driven by the sprockets. The frequency of the chordal action equals the ratio of the linear speed of the belt to the belt pitch. The efficiency of vibrational-energy harvesting increases if the resonant frequency of the piezoelectric device equals the frequency of the linear speed pulsations in the belt caused by the chordal action. One way to achieve highly efficient harvesting is to tune or select the resonant frequency of the piezoelectric device to match the frequency of belt vibration closely. Another way is to tune the vibration to match the resonant frequency of the piezoelectric device by, for example, adjusting the linear speed of the belt. Alternatively, the amount of vibrational energy available for harvesting can be increased by increasing the amplitude of the chordal action by using smaller-diameter sprockets with fewer teeth.

Unlike flat belts, which are frictionally drive by pulleys, modular plastic conveyor belts, which are constructed of a series of rows 29 of fixed-pitch belt modules or links 31, are positively driven by sprockets. Consequently, like power chains, modular plastic conveyor belts are subject to chordal, or polygonal, action as the fixed-pitch belt is driven by the sprockets. The frequency of the chordal action equals the ratio of the linear speed of the belt to the belt pitch. The efficiency of vibrational-energy harvesting increases if the resonant frequency of the piezoelectric device equals the frequency of the linear speed pulsations in the belt caused by the chordal action. One way to achieve highly efficient harvesting is to tune or select the resonant frequency of the piezoelectric device to match the frequency of belt vibration closely. Another way is to tune the vibration to match the resonant frequency of the piezoelectric device by, for example, adjusting the linear speed of the belt. Alternatively, the amount of vibrational energy available for harvesting can be increased by increasing the amplitude of the chordal action by using smaller-diameter sprockets with fewer teeth.

As shown in FIG. 3, the tension in the conveyor belt 10 in the returnway segment 19 is low. Consequently, the belt forms a catenary 28 between the support rollers 26, 27. The catenary has a resonant frequency that is a function of belt pitch, catenary depth, belt weight, belt spring constant, and the distance between the two support points of the catenary, i.e., the spacing between the return shoes or rollers 26, 27. When the frequency of belt vibration equals the resonant frequency of the catenary, the catenary vibrates aggressively, as indicated by arrow 50. Consequently, belts are normally operated at a speed that does not induce in the belt significant vibrational frequencies at the resonant frequency of the catenary. But, to make more vibrational energy available for harvesting, the speed of the belt or one of the other belt variables can be adjusted to induce the catenary to resonate and couple more energy to the piezoelectric device.

Surging is another source of resonant vibration in a fixed-pitch belt. A resonant compression and expansion of the belt, surging usually occurs on the carryway segment 18 of the belt path, as indicated by arrow 51. The resonant frequency is a function of belt pitch, spring constant, and linear belt speed. Energy harvesting is enhanced by adjusting these quantities for a particular application to cause resonance.

Instead of a piezoelectric device harvesting the kinetic energy of a vibrating belt, an electrostatic device can be used. An electrostatic energy-harvesting device comprises a charged variable capacitor, or varactor, whose capacitance changes as a function of belt vibration. Changes in capacitance due to vibration cause voltage changes across the plates of the varactor. The changing voltage charges the energy-storage device. The varactor, which is designed to operate in resonance, is selected to have its resonant frequency as close as possible to the vibration frequencies expected to be present. Thus, the vibration-sensitive varactor may be used as an energy-harvesting device disposed in or on the conveyor belt 10.

Figure 4:
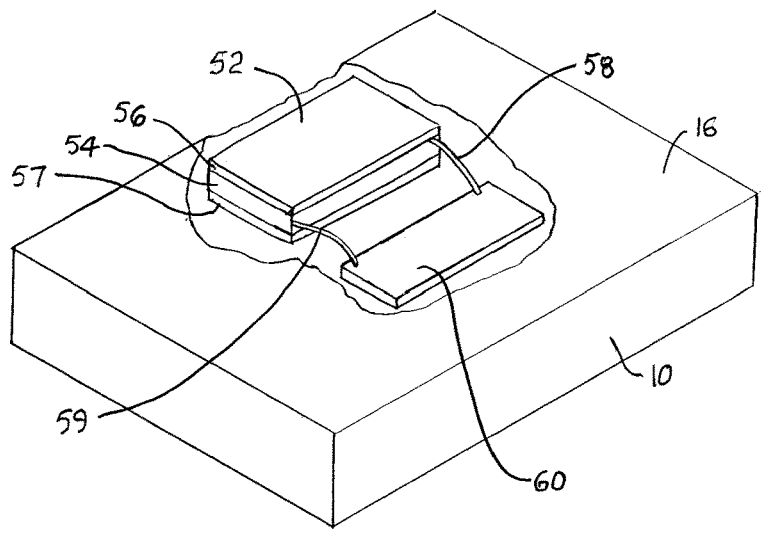
FIG. 4 is an isometric view of a conveyor belt module in a conveyor belt as in FIG. 1 with a thermoelectric generator.

Yet another version of an energy-harvesting device is illustrated in FIG. 4. A thermoelectric generator (TEG) 52 comprises positively doped (p-type) and negatively doped (n-type) semiconductor materials 54 in a layer forming a p-n junction sandwiched between a first heat exchanger 56 and a second heat exchanger 57. The TEG 52 is embedded in the conveyer belt 10 with its first heat exchanger 56, which is in contact with one of the semiconductor material, disposed at the outer surface 16 of the belt for exposure to the temperature of the process through which the belt advances. The second heat exchanger 57, in contact with the other semiconductor material, is disposed in the inner core of the conveyor belt. By the Seebeck effect, a voltage is generated when a temperature gradient is established across the two layers of semiconductor materials. So, as the conveyor belt advances through a process whose temperature varies, the temperature lag between the core of the weakly conductive belt and the temperature of the process establishes a temperature difference between the two heat exchangers 56, 57 that generates a voltage charge on the two wires 58, 59 connected for the semiconductor materials. The two wires are connected to the embedded electrical device 60, which includes the rectifier, energy-storage device, and other electronics powered by the harvested thermoelectric energy.

Figure 13:
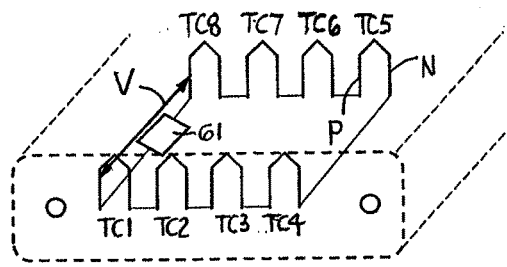
FIG. 13 is an oblique view of an array of thermistors embedded in a modular conveyor belt link usable in a conveyor belt as in FIG. 1 shown in phantom.

Alternatively a TEG can be realized as a thermocouple TC1-TC8 comprising two metal-alloy wires—one a p-type P, the other an n-type N—welded together as shown in FIG. 13. The wires are connected electrically in series and thermally in parallel. A voltage V is generated as one side is heated and the other cooled. The changing voltage is rectified and charges an energy-storage device 61. More energy can be harvested by connecting multiple p-n junctions in series and multiple series of junctions in parallel to form a thermoelectric battery. Thus, a TEG is especially effective at harvesting energy in a conveyor belt that is used in a heating or cooling process in which a plastic or other low-conductivity belt is subjected to varying temperatures.

Figure 5A:
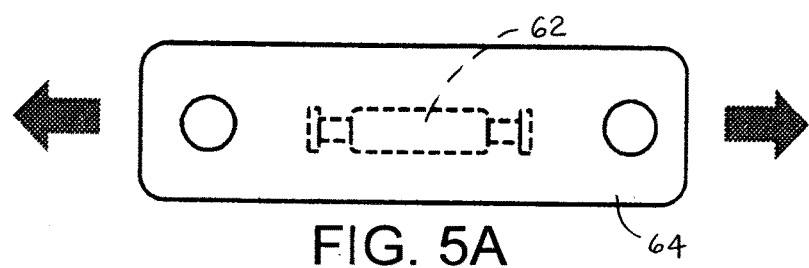
FIGS. 5A-5C are side views of three versions of piezoelectric devices embedded as strain generators in modular conveyor belt links usable in a conveyor belt as in FIG. 1.
Figure 5B:
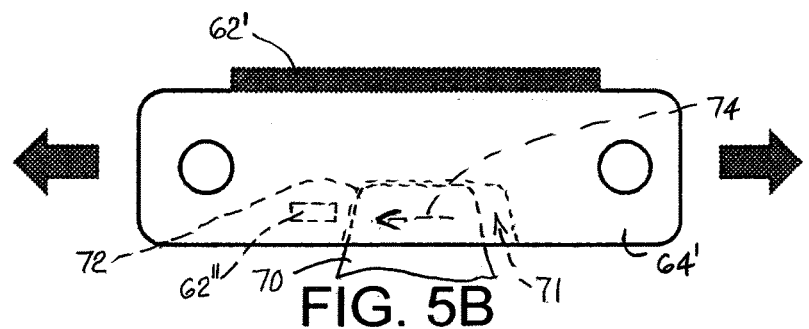
Figure 5C:
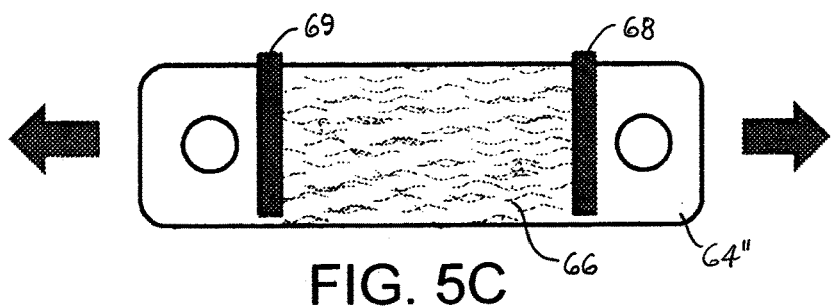

As the conveyor belt 10 in FIG. 1 transports articles along the carryway 12, the weight of the belt and the articles, acting through a friction factor between the bottom of the belt and the carryway surface, creates a resisting force to belt motion that exhibits itself as belt tension. The tension increases from the infeed end of the carryway to the discharge end. The conveyor belt has an associated spring constant that describes the strain of the belt under tension. The belt strain is relaxed in the low-tension belt return segment 19. As shown in FIG. 5A, a piezoelectric device 62 is embedded in a modular conveyor belt link 64. As the belt containing the link strains during its advance along the carryway, the piezoelectric material in the device 62 is strained and a voltage generated. As with the other energy-harvesting devices, the voltage is rectified to charge the energy-storage device. Instead of being molded into the belt link 64, as in FIG. 5A, the piezoelectric strain generator 62' can be mechanically fastened or bonded to a modular link 64', as in FIG. 5B. As another alternative, piezoelectric fibers 66 are co-injected with the base polymer during injection molding of a link 64", as in FIG. 5C. With the fibers aligned and suitable electrodes 68, 69 attached to route the voltage to an energy-storage device, the modular link 64" serves as a supporting matrix for the fibers. As the link strains, the fibers are strained and produce a voltage that is used to charge the energy-storage device. Instead of measuring strain caused by belt tension along the carryway, a piezoelectric energy-harvesting device could be used to respond to the drive force of a sprocket tooth 70 pushing against a drive pocket 71 in the belt module, as shown in FIG. 5B. In this example, a piezoelectric device 62" located close to the drive pocket 71 responds to the force of the tooth 70 against the drive surface 72 as the sprocket rotates in the direction of arrow 74. The force is greatest when the tooth of the drive sprocket engages the drive pocket at top dead center and decreases as the modular link 64' makes its way around the sprocket to the exit point.

Figure 6:
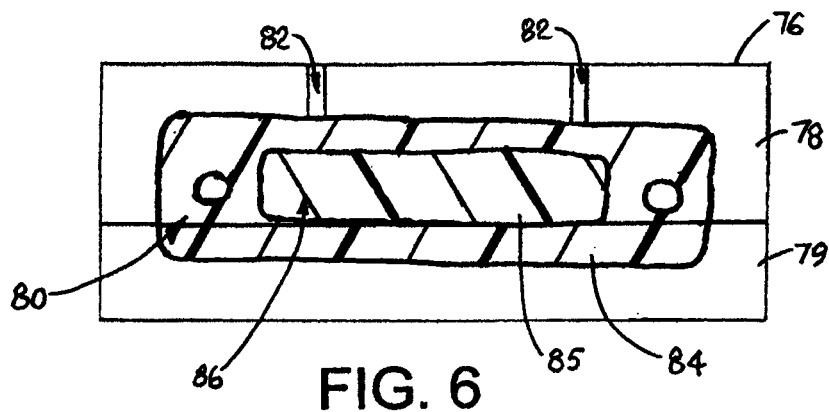
FIG. 6 is a side view of a mold for injection-molding a modular conveyor-belt link with a p-n thermocouple junction for use in a conveyor belt as in FIG. 1.

A TEG can be a separate device embedded in or attached to a conveyor belt or modular link as previously described, or it can be realized as a custom modular link. FIG. 6 shows a mold 76 comprising two mold halves 78, 79 that, when pressed together, form a cavity 80 for molding a modular plastic belt link. First, an electrically conductive first material doped either positively or negatively is injected into the mold cavity 80 through injection ports 82. The first material fills the cavity from the outside in and forms an outside material coating 84 around an inner void 86. An electrically conductive second material doped opposite to the first material is then injected into the cavity to fill the void as an inside material 85 and form a p-n junction with the first outside material along their interface. Heat and pressure are applied to the mold halves to mold the conveyor belt module. After the mold halves are parted and the module ejected, an electrode connection (not shown) is made to the inside material 85.

Figure 7A:
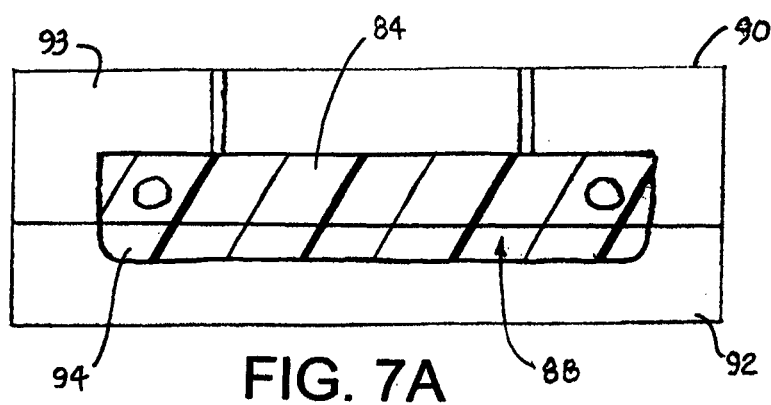
FIGS. 7A and 7B are side views of a molding process for co-molding a modular conveyor-belt link with a p-n thermocouple junction for use in a conveyor belt as in FIG. 1.
Figure 7B:
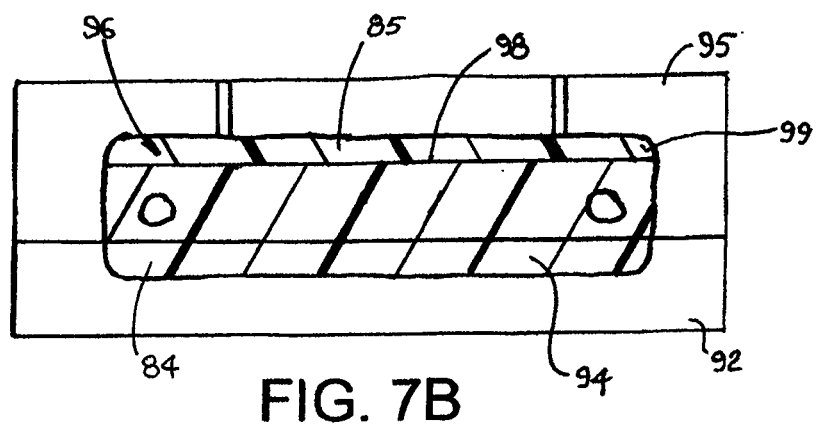

A belt module having an integral p-n junction can alternatively be manufactured in a co-molding process as shown in FIGS. 7A and 7B. First, the electrically conductive first material 84 is injected into a base cavity 88 in a two-part mold 90, consisting of a bottom half 92 and a top half 93. Heat and pressure are applied to the mold to form a module base 94. The top half 93 of the mold is removed and replaced with a second top half 95 closing on the bottom half 92 and the base 94. The second top half 95 has a cavity annex 96 at a top surface 98 of the base 94. The electrically conductive second material 85 is injected into the cavity annex 96 to fill the annex. Heat and pressure are applied to the closed mold halves to form a top layer 99 atop the oppositely doped base layer 94. The interface between the two layers forms a p-n junction. Electrodes can be added in a secondary manufacturing step. Thus, a belt module with a molded-in p-n junction to operate as a TEG can be made by either of these injection-molding processes.

Figure 8:
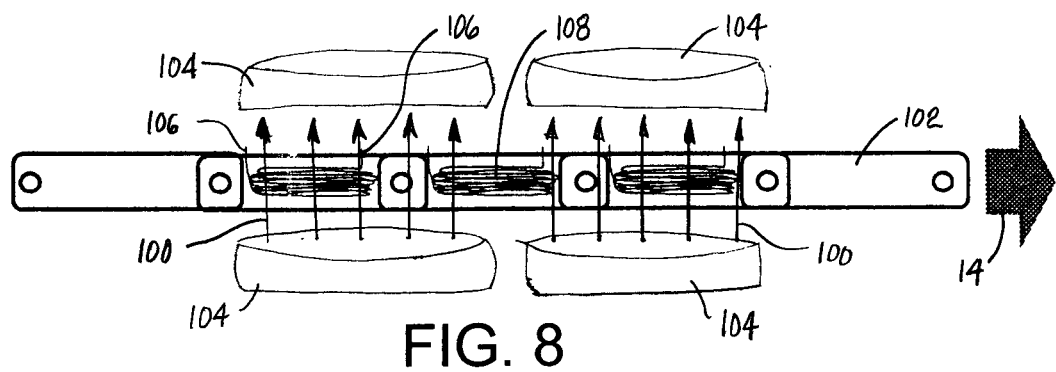
FIG. 8 is a side view of a portion of a conveyor belt as in FIG. 1 with a linear electric generator.

FIG. 8 shows the harvesting of energy by means of a linear electric generator scavenging energy from the belt's linear motion. Fixed magnetic fields 100 traversing the conveyor belt 102 are generated by electromagnets or permanent magnets 104 along one or more portions of the belt's conveying path. The belt's motion in the conveying direction 14 through the magnetic fields induces a voltage across the terminals 106 of coils 108 embedded in the conveyor belt 102. The induced voltage is rectified and charges a local energy-storage device.

Figure 9:
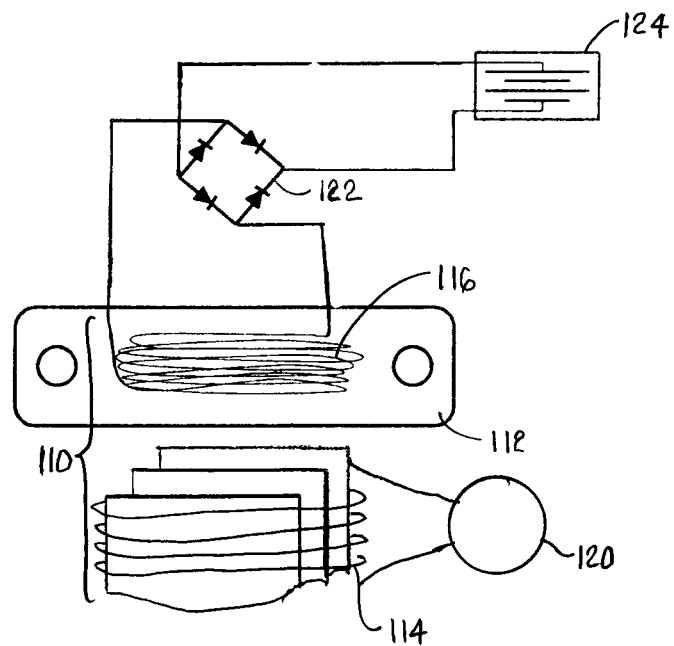
FIG. 9 is a side view of a portion of a conveyor belt as in FIG. 1 with an inductively coupled electric generator.

As shown in FIG. 9, a transformer 110 is used to couple energy to a conveyor belt 112. The transformer comprises a primary winding 114 mounted at a fixed location along the belt's path. A coil 116 in the belt 112 acts as the secondary winding of the transformer. When the primary winding is energized by an ac source 120, an ac voltage is induced in the secondary winding, i.e., the coil 116, by transformer action. The ac voltage is rectified in a rectifier 122 and charges an energy-storage device 124, such as a capacitor or battery, mounted in or on the conveyor belt 112. The transformer allows the energy-storage device to be charged while the belt is stationary with the coil 116 stopped at the charging station defined by the location of the primary winding 114. Alternatively, one or more charging stations along the length of the conveying path can be used to charge the energy-storage device while the conveyor belt is advancing or stationary. Other charging stations can be located along the conveyor belt's path.

Figure 10:
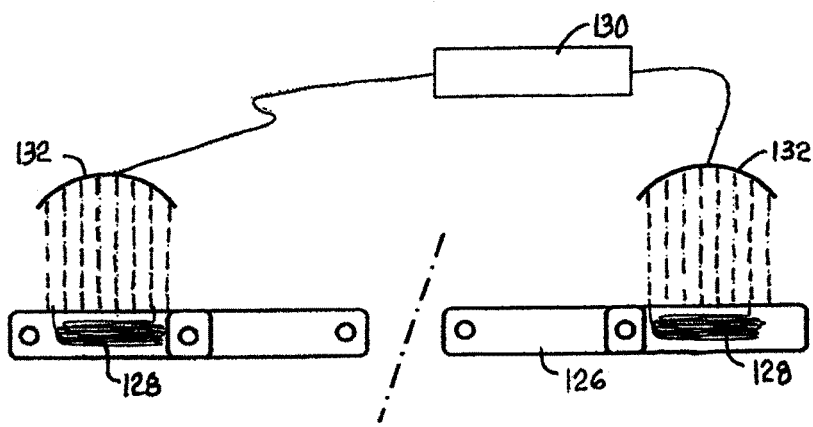
FIG. 10 is a side view of a portion of a conveyor belt as in FIG. 1 with a radio-frequency energy harvester.

Another energy-harvesting technique is shown in FIG. 10. A conveyor belt 126 has antenna coils 128 connected to a rectifier and energy-storage device as in FIG. 9. An external radio-frequency (RF) transmitter 130 is coupled to transmitting antennas, such as directional antennas 132, to direct the RF energy at the conveyor belt and limit scatter. The belt-borne antenna coils 128 receive the generated RF signal and send it to a rectifier and energy-storage device, as in FIG. 9 for use by other electrical components disposed in or on the belt.

Figure 11:
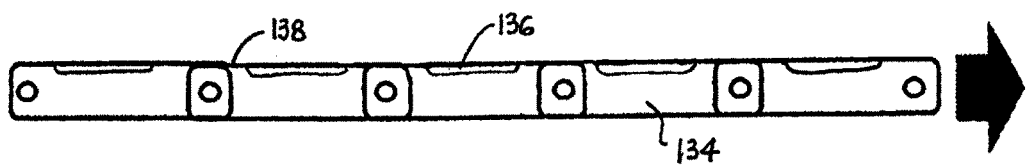
FIG. 11 is a side view of a portion of a conveyor belt as in FIG. 1 with a photovoltaic energy harvester.

FIG. 11 shows a conveyor belt 134 with photovoltaic devices 136 mounted at an outer surface, such as a top surface 138, of the belt. The photovoltaic devices convert incident radiation, such as visible light, into a voltage that is rectified and used to charge a local energy-storage device. In this way, artificial or solar light can be harvested to power electronic devices on a conveyor belt.

Figure 12:
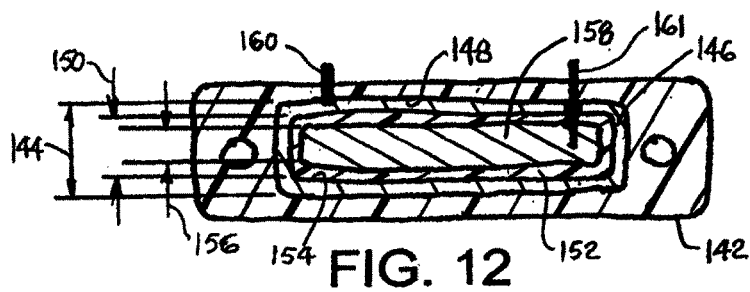
FIG. 12 is a side view of an injection-molded modular belt link with an embedded energy-storage capacitor usable in a conveyor belt as in FIG. 1.

One of the energy-storage devices that can be used in the conveyor belts described is a capacitor, which may be a separate device attached to or molded into the belts. But a storage capacitor can also be formed with the belt in an injection-molding process, as shown in FIG. 12. First a non-conductive polymeric material is injected into a mold cavity to form an outer insulating layer 140 of a modular belt link 142 surrounding a first interior void 144. Then, a conductive polymeric material is injected into the first interior void to form a conductive layer 146 coating the interior surface 148 bounding the first interior void 144. A dielectric polymer is then injected into a second smaller interior void 150 to form a dielectric layer 152 coating the inner surface 154 of the conductive layer 146 and surrounding an even smaller third internal void 156. Next, the conductive material is injected into the third internal void to fill it and form a conductive plate 158 in the core of the modular link. Heat and pressure are applied to the mold to form the conveyor belt module 142 with an integrally molded capacitor in which the conductive plate 158 is separated from the conductive layer 146 by the dielectric layer 152. Electrodes 160, 161 can be connected to each of the conductive plate 158 and the conductive layer 146 in a secondary manufacturing step to form terminals of the capacitor that can be accessed for charging by an energy-harvesting device and for powering on-board electrical or electromechanical components.

Although various versions of energy-harvesting and -storage devices have been described in detail, other versions are possible. For example, electroactive polymers that change shape with applied voltage will conversely generate a voltage when mechanically strained. Consequently, a modular belt link molded out of an electroactive polymer is usable to harvest energy in a like manner to a piezoelectric material.

What is claimed is:

1. A conveyor belt comprising:
    a belt body molded of a base polymer;
    an energy-harvesting device disposed in or on the belt body;
    an energy-storage device disposed in or on the belt body and coupled to the energy-harvesting device to store energy harvested by the energy-harvesting device;
    an electrical device disposed in or on the belt body and powered by energy stored in the energy-storage device;
    wherein the energy-harvesting device includes piezoelectric fibers co-injected with the base polymer during molding of the belt body.

2. A conveyor belt as in claim 1 wherein the electrical device includes a sensor making sensor measurements and a transmitter, the transmitter transmitting the sensor measurements remotely.

3. A conveyor belt as in claim 1 wherein the energy-harvesting device harvests energy from belt vibration.

4. A conveyor belt as in claim 1 wherein the energy-harvesting device harvests energy from belt strain.

5. A conveyor belt as in claim 1 further comprising a voltage regulator electrically coupled to the energy-storage device and the sensor to regulate the voltage to the sensor.

6. A conveyor belt comprising:
    a belt body molded of a base electroactive polymer that generates a voltage when mechanically strained;
    an energy-storage device disposed in or on the belt body and electrically connected to the electroactive polymer to store energy harvested by the electroactive polymer;
    an electrical device disposed in or on the belt body and powered by energy stored in the energy-storage device.

* * * * *